Oct. 29, 1968
H. E. WYMAN ETAL 3,408,503
MONITORING DEVICE FOR REGULATING THE USAGE OF ELECTRIC
CURRENT TO PROVIDE A MORE ECONOMICAL LOAD FACTOR
Filed May 25, 1965
5 Sheets-Sheet 1
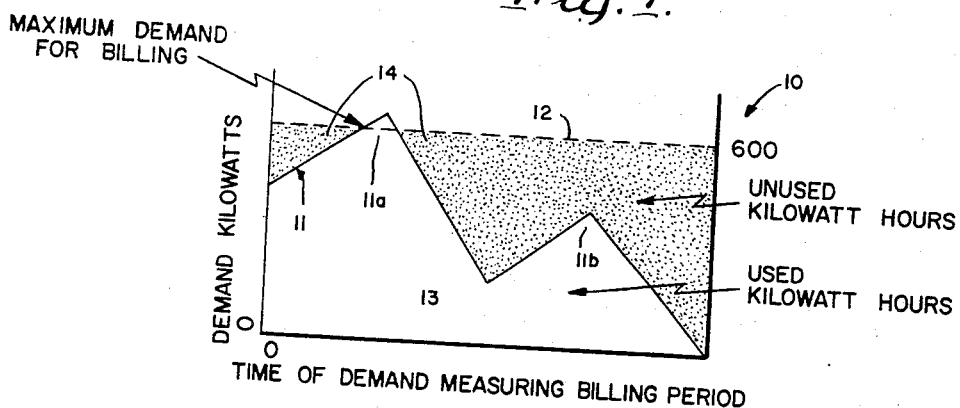
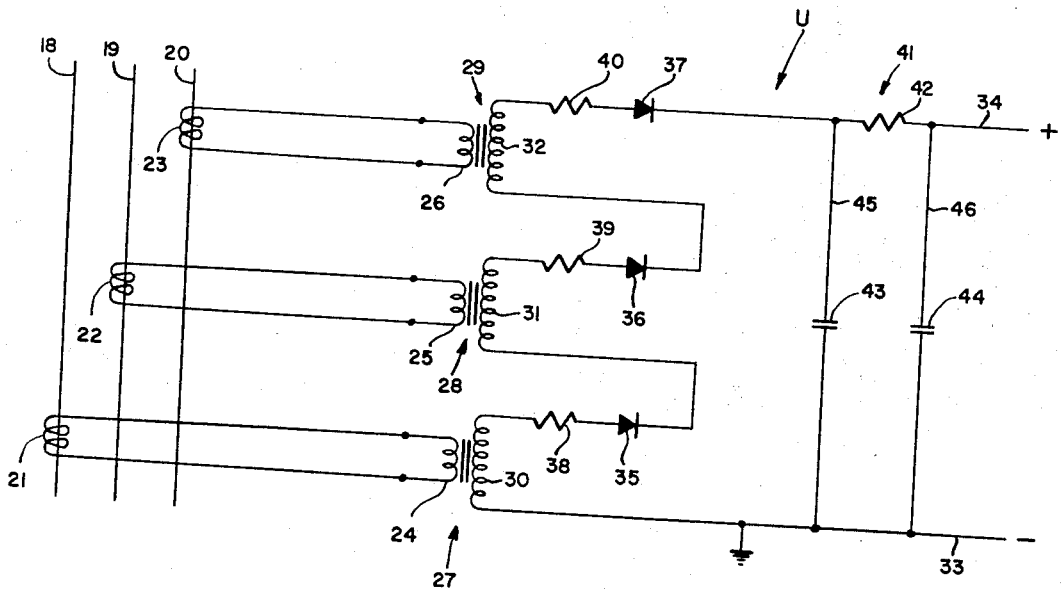
INVENTORS
Harry E. Wyman
John T. Bensley
BY
Popp and Sommer
ATTORNEYS

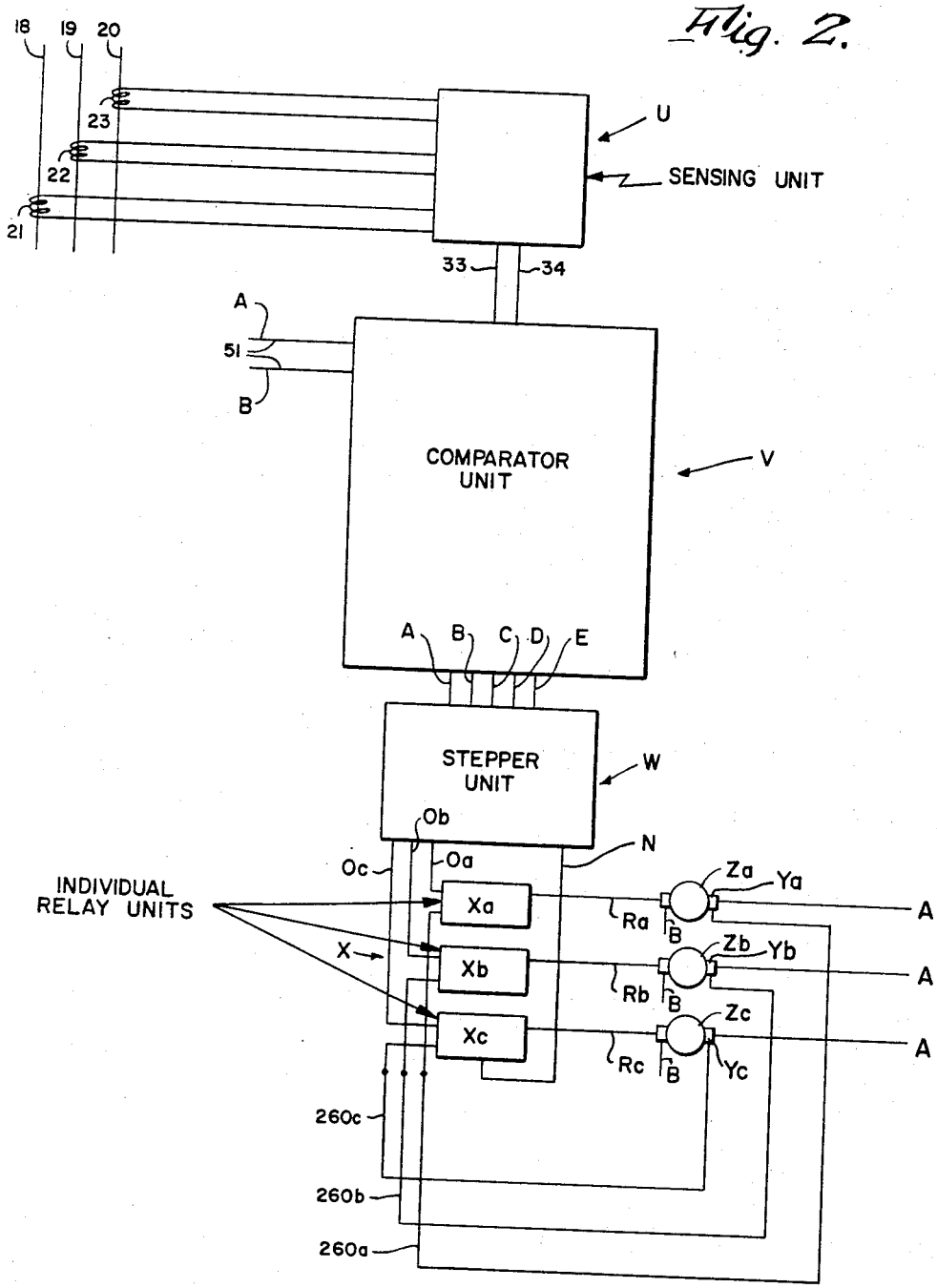

Oct. 29, 1968

H. E. WYMAN ETAL  3,408,503
MONITORING DEVICE FOR REGULATING THE USAGE OF ELECTRIC
CURRENT TO PROVIDE A MORE ECONOMICAL LOAD FACTOR

Filed May 25, 1965

INVENTORS
Harry E. Wyman
John T. Bensley
BY
Popp and Sommer
ATTORNEYS

Oct. 29, 1968

H. E. WYMAN ETAL 3,408,503
MONITORING DEVICE FOR REGULATING THE USAGE OF ELECTRIC
CURRENT TO PROVIDE A MORE ECONOMICAL LOAD FACTOR

Filed May 25, 1965

INVENTORS
Harry E. Wyman
John T. Bensley
BY Popp and Sommer
ATTORNEYS

United States Patent Office 3,408,503
Patented Oct. 29, 1968

3,408,503
MONITORING DEVICE FOR REGULATING THE USAGE OF ELECTRIC CURRENT TO PROVIDE A MORE ECONOMICAL LOAD FACTOR
Harry E. Wyman, Kenmore, and John T. Bensley, Lewiston, N.Y., assignors, by mesne assignments, to The Singer Company, New York, N.Y., a corporation of New Jersey
Filed May 25, 1965, Ser. No. 458,687
1 Claim. (Cl. 307—38)

ABSTRACT OF THE DISCLOSURE

A system is disclosed for regulating the supply of electric power to a load including noninterruptible services and interruptible services having a predetermined priority to provide a means for automatically switching on the interruptible services in said priority order for the purpose of providing a more economical load factor. Means are provided to generate a load demand signal which is proportional to the total power demand at any instant. Two fixed reference signals are established representing respectively the desired maximum and minimum demands. The load signal is compared with each of said fixed reference signals respectively in difference amplifiers, the outputs of which control respective switching relays. The operation is such that if the load demand signal rises above the fixed maximum demand signal, the switching relay simultaneously dumps *all* the interruptible loads. If, then, the load demand signal goes below the fixed minimum demand signal, the loads are picked up one by one in priority order until the load demand signal is above the fixed minimum demand signal but less than the fixed maximum demand signal in which case the system is balanced. The sequential pick up of the individual loads is accomplished by a non-reversible motor-operated cam switch which pulses a solenoid stepping switch having a reset winding which, when energized, returns the switch to its initial position.

This invention relates to a monitoring device for regulating the usage of electric power to provide a more economical load factor, load factor being defined as the ratio of the average load carried by a power station or a system for a given period to the maximum load during that period. More specifically, the invention relates to such a monitoring and regulating device for automatically lowering the unit cost of electric energy by improving the load factor.

With industrial users, for example, of electric energy the rate schedule of filed rate tariff of a power company provides a two part rate consisting of a separate charge (1) for peak demand during a billing period and (2) for the measured kilowatt hours actually used that billing period. For example, the graph FIG. 1 plots kilowatt demand against time as terminating at the end of a billing period, say thirty days. The horizontal dotted line represents the peak demand for that billing period and is determined by the peak consumption measured for a fifteen minute period during the assumed thirty day billing period. If during the billing period this peak, for a fifteen minute period, should exceed the peak indicated by the higher peak of the curve, the dotted line would rise on the graph to establish a new and more unfavorable maximum demand rate for billing the user. Conversely, a lowering of the highest kilowatt peak of the curve, for a fifteen minute period, would establish a more favorable maximum demand rate for billing the user. More important, since the rate or charge for measured kilowatt hours (the curve of the graph) is more favorable with increased consumption of current actually used, the shaded area above the curve represents lower unit cost current than the unshaded area below the curve. Accordingly this shaded area represents the amount of electric energy available to an industrial, commercial, municipal or other large scale user of electricity at very much reduced cost without increasing the billing based on peak demand as represented by the horizontal dotted line. In effect it will be seen that the unshaded and shaded areas of the graph, FIG. 1, represent the load factor for a particular billing period, that is, the ratio of the average load carried by a power station for the billing (unshaded area) to the maximum load carried during that period (shaded area).

It is the principal object of the present invention to provide a monitoring device for regulating the usage of electric current which provides a more economical load factor, this being accomplished by utilizing, under automatic control, a maximum amount of the electric current represented by the shaded area of the graph, FIG. 1, which is available at substantially lower cost per kilowatt hour than the current used as designated by the unshaded area below the curve.

Another object, in such a monitoring and regulating device, is to avoid consuming, for an interruptible service, current for any fifteen minute period above a predetermined peak, so that part of the billing rate based on peak demand is not adjusted upwardly to the disadvantage of the user by the use of any interruptible or nonessential service devices.

Another object of the invention is to provide, however, such a monitoring and measuring device which will permit the peak load for a fifteen minute period to exceed the predetermined load in response to demand from essential or noninterruptible services so that essential or noninterruptible services will not be throttled by unavailability of sufficient power.

Another object of the invention is to provide for the usage of the lower cost current in the shaded area of the graph FIG. 1, progressively for interruptible or nonessential devices of decreasing importance so that as the kilowatt curve of electric current consumption for noninterruptible or essential services rises, the current consumption for interruptible or nonessential devices is successively diminished in inverse proportion to their importance.

Another object of the invention is to permit of reducing both the peak demand billing part as well as the measured kilowatt hours billing part of the two part billing rate used, this being accomplished by a preliminary study of the customers' requirements and separating the noninterruptible uses or essential services from the interruptible or nonessential devices or services and at the same time giving priority to those interruptible or nonessential devices which are the most important to maintain continuously.

Another object of the invention is to provide such a monitoring and control device which can be readily adjusted to establish a different predetermined peak for consumption over a fifteen minute period, such adjustment being highly important where the user's requirements for electric current vary to a marked degree from season to season, for example.

Another object is to provide a monitoring and control device which is compact and can readily be mounted on the wall of the basement or power inlet area of the building or control room of the user.

Another object is to provide such a monitoring and control device in which interruptible simple unitary plug-in mechanisms are employed to cut interruptible services into and out of operation, this permitting not only of rapid and low cost repair in the event of failure of one of these plug-in mechanisms, but also permitting of increasing or decreasing the number of circuits for interruptible services.

Another object is to provide such a monitoring and control device which is reliable in operation and is not likely to get out of order.

Other objects and advantages of the invention will be apparent from the following description and drawings in which:

FIG. 1 is a simplified graph of the measured current consumption of, say, an industrial user, with the kilowatt consumption plotted against time for a billing period, say thirty days, with a dotted horizontal line indicating the maximum demand for that period over, say, a fifteen minute period and which dotted line establishes the base for measuring the maximum demand in calculating the billing based on a two part rate schedule, the other part of this two part rate schedule being based on the measured kilowatt hours as represented by the curve for the graph.

FIG. 2 is a wiring diagram of a complete circuit embodying the present invention, the circuit being simplified in that subassemblies are shown in block diagram form, these subassemblies being illustrated in detail in subsequent figures.

FIG. 3 is a circuit diagram of the sensing unit U shown in block diagram form in FIG. 2.

FIG. 4 is a circuit diagram of the comparator unit V shown in block diagram form in FIG. 2.

Figure 5:
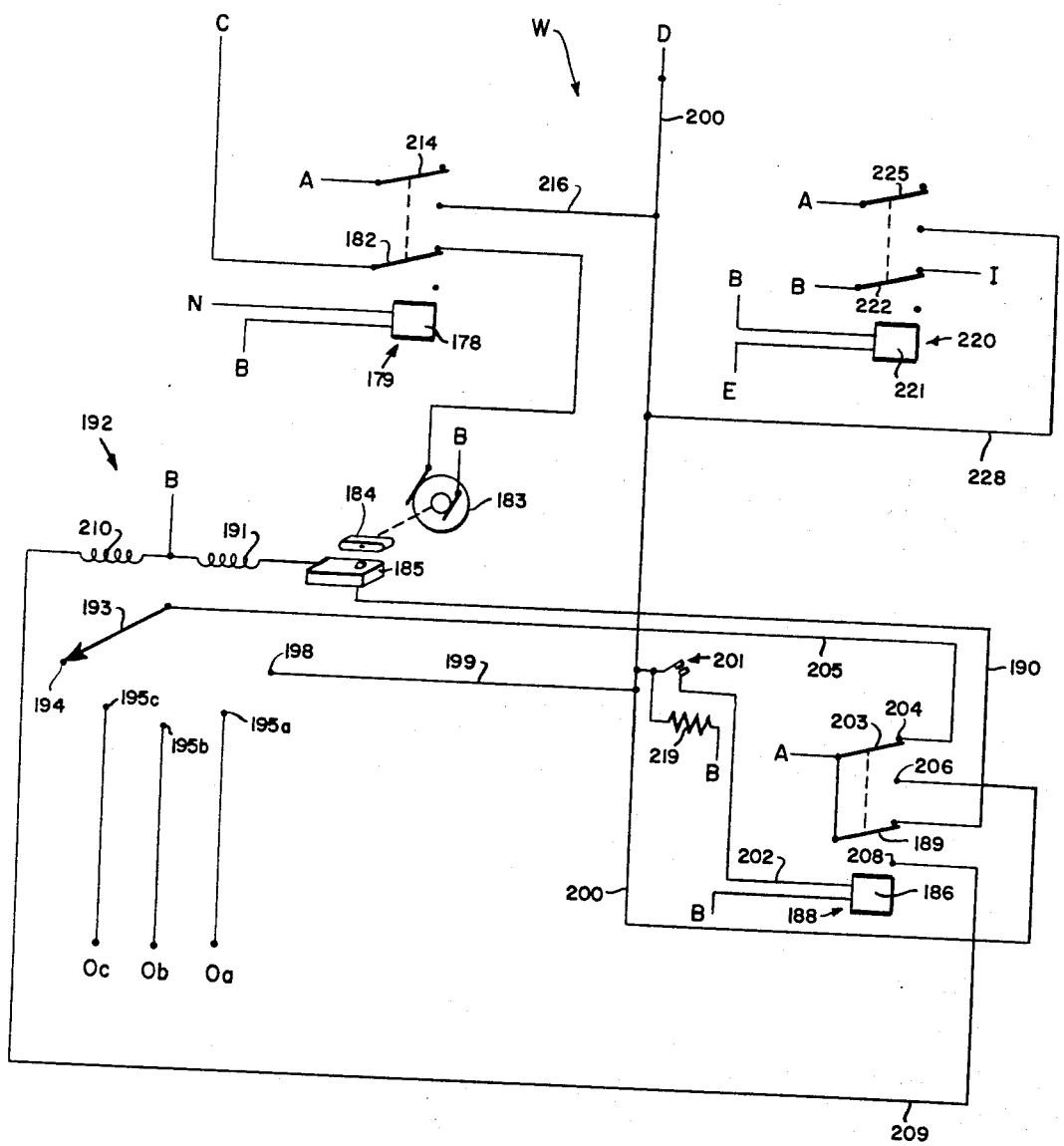
FIG. 5 is a circuit diagram of the stepper unit W shown in block diagram form in FIG. 2.

Electric power must be used the moment it is generated. On the other hand there are wide swings in the current consumption of most industrial customers, depending on whether the plant is running or shut down, whether or not high current consumption equipment is in operation, variation in demand from season to season, etc. The current generating company is required not only to meet the widely fluctuating demand of each customer, but also to provide supply line and transformer facilities capable of meeting any maximum sustained peak demand of each customer. Inadequate supply line and transformer facilities for a customer would result in their breakdown upon the customer drawing the maximum peak demand for a sustained period, say, fifteen minutes. It will also be apparent that both the kilowatt consumption as well as the maximum sustained peak kilowatt demand will vary widely between a small industrial customer and a customer operating a large industrial complex with a heavy power demand. It will also be apparent that entirely different power line and transformer facilities must be provided for such two customers.

In the graph 10, FIG. 1, the electric current consumption of such an industrial user, measured in demand kilowatts, is plotted against the time of a billing period, say thirty days. For simplicity the curve 11 of this graph is shown as having two peaks 11a and 11b, the peak 11a being higher than the other. Over the assumed thirty day period the current consumption is bound to reach a maximum sustained value which is maintained over a fifteen minute period. Such maximum sustained value over such a fifteen minute period is represented by the dotted horizontal line 12 which cuts across the crest of the higher peak 11a for the assumed fifteen minute period. If this higher peak 11a were still higher, or flatter, the line 12 would rise. Conversely, if this higher peak 11a were lower or steeper, the line 12 could be lower.

The billing of such an industrial user takes into consideration not only its actual current consumption, but also the sustained peak current consumption over the assumed fifteen minute period during the billing period (such peak current consumption for a fifteen minute period represented by the dotted line 12, FIG. 1). Accordingly the metering of an industrial user involves not merely measuring the kilowatt hour consumption, as with a household user, but in addition measuring the kilowatt demand against time so that, in the billing period, the value of the peak current consumption over the assumed fifteen minute period (dotted line 12, FIG. 1) can be determined. This line 12 can be high during one billing period and low during another, as where the current consumption of the customer is seasonal.

In such billing of an industrial customer, the charge is made for the actual kilowatt consumption for the billing period (represented by the unshaded area 13 under the curve 11, FIG. 1) but the charge is based on the maximum demand for billing as represented by the dotted line 12 in this figure. Thus the higher the line 12, FIG. 1, the higher the charge for each kilowatt hour consumed by the industrial customer during the billing period.

Accordingly with such two part rate it is to the customer's interest to maintain the dotted line 12 as low as possible since this determines the base on which his kilowatt consumption rate is based. However it is also obviously to the customer's interest, after achieving such a low positioning of the dotted line 12, FIG. 1, for any billing period, to use as much as possible of all kilowatt hours below this line 12 because such current is cheaper as compared with current consumption which would raise the line 12.

In FIG. 1, the areas 14 between the curve 11 and the dotted line 12 is dotted to represent the unused kilowatt hours of such "cheap" current, that is, current which could be used without raising the dotted line 12 and hence the base on which the kilowatt consumption charge is made for the billing period. For the interest of the customer, ideal current consumption would be to eliminate all of the dotted area 14 of unused "cheap" current, that is, to have the curve 11 in the form of a straight line curve coinciding with the line 12. Such a use would also be beneficial to the power company supplying the current since it would eliminate an undesirable fluctuating demand for service, bearing in mind again that electric power must be consumed the moment it is generated. Of course, this ideal cannot be achieved by practically any industrial user, but it is the aim of the present invention to do so as much as is possible, particularly in utilizing the shaded area 14 for interruptible or nonessential devices or services so that the essential or non-interruptible services will be maintained at all times even if such maintenance should raise the dotted line 12 and hence the base on which the consumed kilowatt hours are charged for during the billing period.

In general, the present invention accomplishes this by:
(1) Continuously measuring the instantaneous kilowatt power consumption.
(2) Translating this continuous measurement into a DC signal proportionate to such consumption.
(3) Establishing or setting a point of desired maximum current consumption at any time. This establishes the demand kilowatt level of the dotted line 12, FIG. 1 and hence the base for billing the actual current consumption for the monthly billing period and hence this line is set as low as is consistent with the expected peak noninterruptible or essential service requirements over a fifteen minute period. Other factors may, of course, also enter into setting this point of desired maximum current consumption, such as making seasonable provisions for nonessential or interruptible services or devices.

(4) Utilizing the DC signal to cut nonessential or interruptible devices progressively into operation as the signal deminishes from such set point of desired maximum current consumption as soon as a sufficient increment of power becomes available for this purpose without raising the set point. As each increment of power below this set point becomes available in an amount sufficient to satisfy the next-in-line in diminshing importance of an interruptible service device such device is rendered operative in response to the signal.

(5) Conversely, in response to a strengthening DC signal progressively cutting out of service the succession of interruptible or nonessential devices as the power consumption increases. This insures that the operation of the interruptible or nonessential devices will not carry the total current consumption higher than the set point of desired maximum instantaneous power consumption. Accordingly the operation of interruptible or nonessential devices is prevented from establishing a more unfavorable billing base for the consumer.

(6) Nevertheless, permitting the set point (line 12) of desired maximum power consumption to be raised or exceeded by any amount which may be required to satisfy those essential services which must not be interrupted.

The sensing unit U

Referring to FIGS. 2 and 3, the numerals 18, 19 and 20 represent the three lines of a three phase industrial power supply line. The current passing through each of these lines energizes the corresponding pickup coil 21, 22, 23 each in series with a corresponding primary coil 24, 25, 26 of a transformer 27, 28, 29 of a sensing unit U. The secondary coils 30, 31, 32 are in series with each other and also with the two sides 33, 34 of the DC signal output line of the sensing unit U. The three secondary coils 30, 31, 32 are also in series with three rectifiers 35, 36, 37 and with a surge current limiting resistor 38, 39 and 40 associated with each rectifier, each rectifier being arranged at the corresponding side of the secondary coil of the transformer 27, 28 and 29 associated therewith. A brute force filter 41 is also provided across the rectified output of the three transformers 27, 28, 29, this being shown as a resistor 42 in the side 34 of the signal output line flanked by condensers 43, 44 in bypass lines 45, 46 connecting the two sides 33, 34 of the signal output line.

It will be seen that the sensor U provides a DC signal output through the sides 33, 34 of its output line which is proportional to the total power take supplied to the customer through the three phase power supply line 18, 19, 20.

The comparator unit V

Referring to FIGS. 2 and 4, the numeral 50 represents a regulated DC power supply which also supplys filament current for electronic tubes as well as a differential modulating signal for these tubes. This regulated DC power supply, filament current, and modulating signal is provided from AC power supplied from the AC power supply line A and AC return B of an AC supply line 51, this line appearing in other drawings and the same letters being used to identify its supply and return sides.

These sides of the AC power supply line 51 connect with opposite ends of the primary winding 52 of a transformer 53 having two secondary windings 54 and 55.

The secondary winding 54 is a filament voltage winding having one end grounded and the other end supplying AC current to the filaments of twin reference and amplifier triodes, shown in the lower half of FIG. 4, via a line G connected to the other end of this secondary winding 54. This secondary filament winding 54 has the additional function of providing an AC differential modulating signal for high and low amplifier tubes of the circuit, the line G connecting with the centertap of a resistor 118 for this purpose as hereinafter described.

The secondary winding 55 is part of the regulated DC power supply 50, this winding having a grounded centertap and connecting at one end to a rectifier 56 providing positive output voltage to a line 58 and this secondary winding 55 connecting at its other end to a rectifier 59 which is biased in a reverse direction to the rectifier 56 to provide negative voltage to a line 60. A brute force filter 61 is provided across these lines 58 and 60 and is shown as comprising resistors 62 and 63 provided respectively in the lines 58 and 60 and flanked by condensers 64 in bypass lines 65 and 66 connecting the two lines 58 and 60.

The negative voltage line 60 of the regulated DC power supply 50 connects with a line F providing a negative bias to the grids of the high and low relay switching twin triodes 72 and 73 as hereinafter described, this line 60 being preferably grounded through a condenser 68 and resistor 69 as shown.

The plate voltage for high and low reference twin triodes 70 and 71 and the plate voltage for one triode section 81 and 84 of the high and low relay switching twin triodes 72 and 73 is taken from the positive side 58 of the power supply 50 via a plate voltage line H connecting with this positive output voltage line 58. This plate voltage line H connects directly with the plates of both triode sections 74 and 75 of the high reference twin triodes 70 and connects directly with the plates of both triode sections 78 and 79 of the low reference twin triodes 71. This plate voltage line H connects through a resistor 80 with the plate of the triode section 81 of the high relay switching twin triode 72, the other triode section of this twin triode being indicated at 82. This plate voltage H connects through a resistor 83 with the plate of the triode section 84 of the low relay switching twin triode 73, the other triode section of this twin triode being indicated at 85.

The positive output voltage from the DC power supply line 58 is also impressed through a resistor 87 on the plate of a gas filled regulating diode 88 having a grounded cathode. This gas filled tube serves to maintain a constant plate voltage with varying voltage outputs at 58 from the filter 61. Thus, if the positive voltage at the filter output 58 rises, the tube current of the diode 88 increases thereby to produce a constant voltage at the plate end of the resistor 87. This gas filled diode 88 is connected by a line 89 to a line 90 providing high reference twin triode 70 of the comparator unit.

This plate of the gas filled diode 88 also connects with the resistor of a series of potentiometers 91, 91a, 91b, 91c, 91d, 91e, and 91f of a variable voltage divider. The slide contacts of these potentiometers severally connect with arcuately arranged switch contacts 92, 92a, 92b, etc., progressively engaged or swept by a pivotally mounted movable switch arm contact 94 connected with a line 95 providing a low reference voltage to the grid of the triode section 78 of the low reference twin triode 71 of the comparator. The switch arm 94 is also preferably connected through a resistor 96 to ground.

The pivotally mounted switch arm 94 is ganged or coupled to move in unison with another pivotally mounted switch arm 97 as indicated at 98. This switch arm 97 sweeps or progressively engages the arcuately arranged switch contact 99, 99a, 99b, 99c, 99d, 99e and 99f severally connected with the slide contacts of a second series of potentiometers 100, 100a, 100b, etc., of a second variable voltage divider. The resistors of these potentiometers are connected by a line 101 and resistor 102 to the positive voltage side 34 of the line from the sensing unit U illustrated in detail in FIG. 3. The negative side 33 of this line from the sensing unit U is grounded as illustrated in FIG. 4.

The pivotally mounted switch arm 97 is connected through a resistor 103 to ground, and also by a line 104 to the grids of the triode sections 75 and 79 of the high and low reference twin triodes 70 and 71.

Each cathode of each of these twin triodes is connected to ground through a cathode resistor 105, 106, 108, 109 of relatively high value which form part of a so-called diode gate, the value of these cathode resistors being the same and the plate voltages of these twin triodes also being the same (line H connected to positive output line 58 of the filter 61 of the regulated DC power supply 50).

Two rectifiers 110, 111 are connected in series aiding relation to each other across the cathodes of the high reference twin triode 70, these rectifiers (preferably diodes) permitting current flow in the direction from the cathode of the triode section 74 toward the cathode of the triode section 75, these rectifiers being connected to each other by a line 112. This interconnecting line connects, through a line 113, to one end of a resistor 118 having a center tap connected to the line G providing AC voltage from the secondary winding 54 of the transformer 53 of the regulated DC power supply 50.

Similarly two rectifiers 120, 121 are connected in series aiding relation to each other across the cathodes of the low reference twin triode 71, these rectifiers (preferably diodes) permitting current flow in the direction from the cathode of the triode section 79 toward the cathode of the triode section 78, these rectifiers being connected to each other by a line 122. This interconnecting line connects, through a line 123, to the other end of the resistor 118 having its center tap connected to the line G.

The line 113 connects, through a line 130 containing a condenser 131, with the grid of the triode section 81 of the high reference relay switching twin triode 72. This line 130, between the condenser 131 and grid of the twin triode 72, connects through a resistor 132 with the line F from the negative voltage output side 60 of the regulated DC power supply 50.

Both cathodes of the high reference relay switching twin triode 72 are grounded and the grid of its triode section 82 is connected by a line 140 with the line F from the negative voltage output side 60 of the regulated DC power supply 50 through resistor 141. This grid of the triode section 82 of the high reference relay switching twin triode 72 is also connected through a condenser 145 in a line 146 with the plate of the triode section 81 of the high reference relay switching twin triode 72.

The plate of this triode section 82 of the high reference relay switching twin triode 72 is connected by a line 148 with the winding 149 of a normally open relay 150, the other side of this winding being connected via line 151 to plate voltage line H which connects with the positive output voltage line 58 of the DC power supply 50. The armature 153 of this normally open relay 150 is connected via a line 154 with the hot side A of the AC power supply line. When energized the relay connects this hot side A of the AC power supply line with a high side voltage control line E.

Similarly, the line 123 connects through a line 160 containing a condenser 161, with the grid of the triode section 84 of the low reference relay switching twin triode 73. This line 160, between the condenser 161 and the grid of the twin triode 73, connects, through resistor 162, with the line F from the negative voltage output side 60 of the regulated DC power supply 50. Similarly to the high reference relay switching twin triode 72, both cathodes of the low reference relay switching twin triode 73 are grounded, and the grid of the triode section 85 is connected by a line 166 with the line F from the negative voltage output side 60 of the regulated DC power supply 50 through resistor 167. This grid of the triode section 85 of the low reference relay switching twin triode 73 is also connected through a condenser 170 with the plate of the triode section 84 of the low amplification twin triode 73.

Similarly to the high amplification twin triode 72, the plate of the triode section 85 of the low reference relay switching twin triode 73 is connected by a line 171 with the winding 172 of a relay 173, the other side of this winding being connected via line 174 to plate voltage line H which connects with the positive output voltage line 58 of the regulated DC power supply 50. The armature 176 of the relay 173 is connected via a line 177 with the hot or supply side A of the AC line 51. In its normal or deenergized condition this armature engages a contact of a balance voltage control line D. When energized this relay engages a contact of a low side voltage control line C.

The stepper relay unit W

Referring to FIGS. 2 and 5, the numeral 178 represents the winding of relay 179 which is energized when no improvement in the use of the current represented by the shaded area 14 of the graph, FIG. 1 is possible. One terminal of the winding 178 of this no improvement possible relay 179 is connected to the return line B of the AC power line 51 and the other end of this winding relay is connected to a line N connected to a series of sensor controlled individual relay units X$a$, X$b$, X$c$, etc., FIG. 6, as hereinafter described. One normally closed armature 182 of this relay 179 is connected with the low side voltage control line C from the comparator unit V, FIG. 4. When the no improvement possible relay 179 is deenergized, this normally closed armature 182 connects this low side voltage control line C with a motor 183, the other side of which is connected to the return side B of the AC line 51, thereby to energize this motor. This motor drives a cam 184 which opens and closes a microswitch 185, and which closes a circuit, when the winding 186 of a reset relay 188 is deenergized, from the hot side A of the AC line 51, through armature 189 of deenergized relay reset 188 line 190, closed cam actuated microswitch 185, and advance step solenoid coil 191 of a step-by-step solenoid switch 192 to the return side B of the AC line. Each time this advance step solenoid 191 is energized it advances the switch arm 193 of the step-by-step solenoid switch 192 from a dead contact 194, progressively, to contacts 195$c$, 195$b$ and 195$a$ of lines O$c$, O$b$ and O$a$, leading, respectively, to relay units X$a$, X$b$, and X$c$, as hereinafter described, of the individual relay units X shown in detail in FIG. 6.

The switch arm 193 then engages a final return contact 198. This final return contact 198 is connected by a line 199 to a line 200 which has a number of different connections, including a normally closed thermally operated time delay switch 201 connecting through a line 202 with one end of the coil 186 of the reset relay 188, the other end of this coil being connected to the return side B of the AC line. This reset relay 188 has another armature 203 connected to the hot side A of the AC line and in the deenergized condition of this reset relay 188, this armature 203 engages a contact 204 at the end of a line 205 leading to the switch arm 193 of the step-by-step solenoid switch 192. The contacts of the thermally operated time delay switch open when the switch is energized and heated.

This armature 203 engages a contact 206 at the end of the line 200. Accordingly when the switch arm 193 engages the final contact 198 current is supplied from the hot or supply side A of the AC line through armature 203 and normally closed thermally operated time delay switch 201 to the coil 186 of relay 188 and return side B of the AC line. This pulls its armature 203 into a holding circuit including the contact 206, current now being supplied from the hot side A of the AC line via line 200 and thermally operated time delay switch 201 through coil 186 of this reset relay 188 to the return side B of the AC line. Accordingly the reset relay is held closed until the normally closed thermally operated time delay switch heats up and opens.

Such energization of the reset relay 188 pulls its armature 189 (connected to the hot side A of the AC line)

into engagement with a contact 208, and through a line 209 and the return winding 210 of the step-by-step solenoid switch 192 to the return side B of the AC line. Energization of this return winding 210 moves the switch arm 193 back to engagement with the open or start contact 194 for repetition of the cycle of the step-by-step solenoid switch 192, i.e., from contact 195a to contact 195b, to contact 195c and to final return contact 198.

The no improvement possible relay 179 includes a normally open armature 214 connected with the hot side A of the AC line and drawn into engagement with a contact at the end of a line 216 connecting with the common line 200.

This common line 200 also connects with the balance voltage control line D from the comparator V and is connected through a resistor 219 to the return side B of the AC circuit.

The stepper relay unit W shown in FIG. 5, includes an additional relay 220. The winding 221 of this relay is connected across the high reference voltage control line E and the return side B of the Ac line. One normally closed armature 222 of this relay is connected to this return side B of the AC line and is drawn into engagement with a contact of the end of a line I which connects with each relay unit Xa, Xb and Xc of the group X of control relay units, as hereinafter described.

The relay 220 has a normally open armature 225 which is drawn into engagement with the contact at the end of a line 228 connecting with the common line 200.

Bank X of relay units

Figure 6:
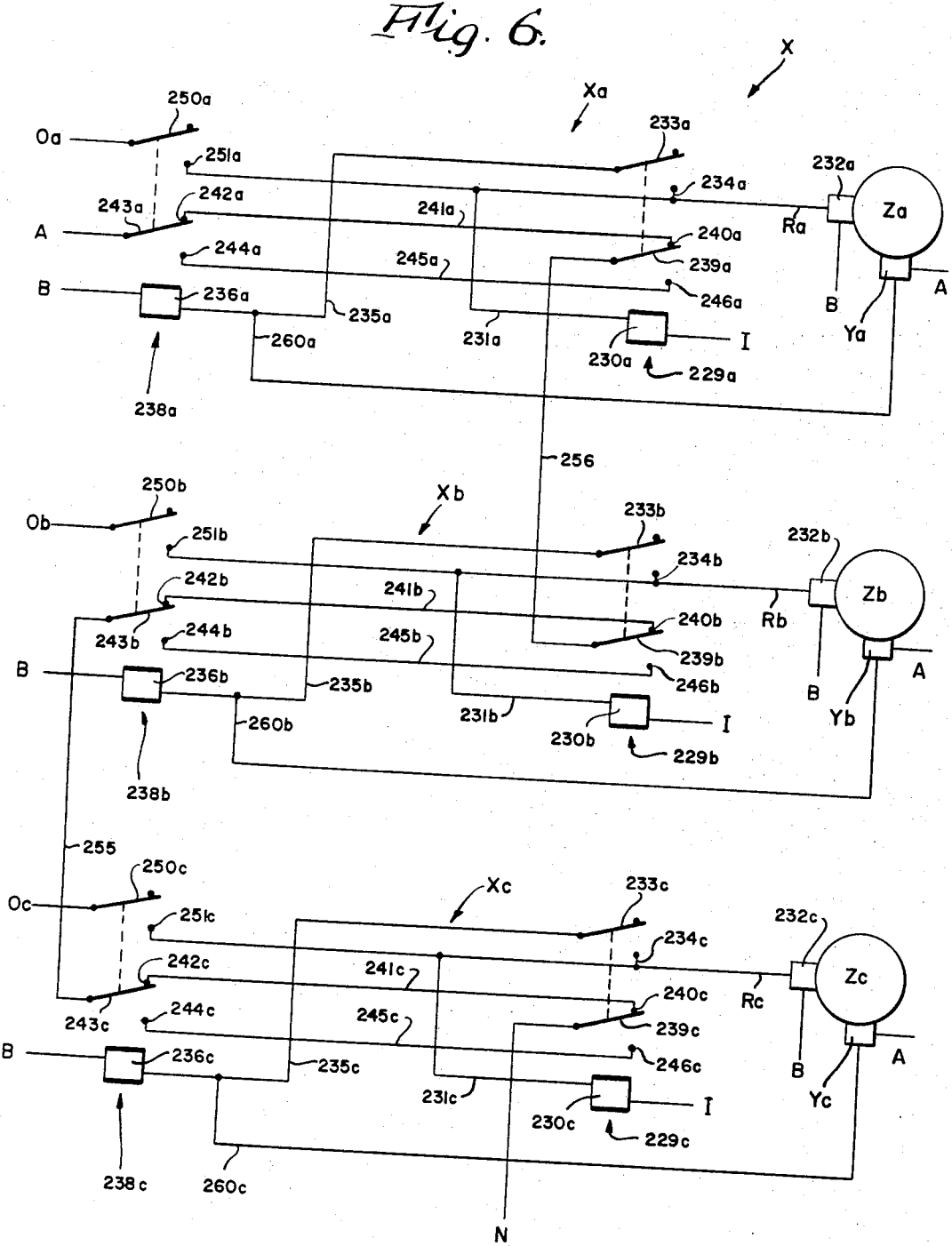
FIG. 6 is a circuit diagram of all of the individual relay units X shown in block diagram form in FIG. 2.

As illustrated in FIGS. 2 and 6, the apparatus includes a bank X of individual relay units Xa, Xb, Xc, etc., each of which is individually controlled both by a sensor Ya, Yb, Yc, respectively and by the stepper unit W, FIG. 5, which in turn is controlled by the comparator unit V, FIG. 4, and the sensing unit U, FIG. 3. Since these individual relay units Xa, Xb and Xc are identical in construction, a description of one (the relay unit Xa) will be deemed to apply to all, corresponding parts being distinguished by the suffixes a, b, and c.

Each relay unit, such as the relay unit Xa, includes a relay 229a having one end of its winding 230a connected to a branch 231a of the line Ra leading to the controller 232a of an electrical service device Za the use of which is not essential at all times and hence the current supply to which can be interrupted in accordance with the present invention to utilize the maximum "cheap" current (represented by the shaded area 14, FIG. 1) when the essential services do not demand the preset peak load (represented by the higher peak 11a of the graph, FIG. 1). The other side of this controller 232a of this interruptible service device Za is shown as connected to the return side B of the AC line. The other end of this winding 230a of the seal in relay 229a is connected to the line I which, as previously described, is under control of the armature 222 of relay 220, FIG. 5 which armature connects this end of the winding 221 with the return side B of the AC line. A normally open armature 233a is drawn into engagement with a contact at the end of another branch 234a of the line Ra leading to the controller of the interruptible electrical service device Za. This armature 233a is connected by a line 235a to the winding 236a of a relay 238a. A second armature 239a of the relay 229a normally engages a contact 240a at the end of a line 241a the opposite end of which is provided with a contact 242a normally engaged by another armature 243a of the relay 238a. This armature is connected with the hot side A of the AC line and is drawn into engagement with the contact 244a at one end of a line 245a. The armature 239a of the relay 229a is drawn into engagement with the contact 246a at the opposite end of this line 245a.

The relay 238a has a second armature 250a connected with the line Oa from the stepper relay unit W. This armature is drawn into engagement with a contact 251a at the end of the line Ra leading to the controller 232a of the interruptible electrical service device Za.

The line N to one end of the winding 178 of the no improvement possible relay 179, FIG. 5, connects with the armature 239c of the relay 229c of the last in line of the relay units Xa, Xb, Xc.

This circuit to this line N is continued by a line 255 connecting the armature 243c of the relay 238c with the armature 243b of the relay 238b. This circuit is continued by a line 256 from the armature 239b of the relay 229b to the armature 239a of the relay 229a which, through the line 241a and armature 243a of relay 238a, completes this circuit to the hot side A of the AC line.

The sensing units Y

Each of the sensing units Ya, Yb, Yc illustrated in FIGS. 2 and 6, sense the demand of the corresponding interruptible service device Za, Zb and Zc, and if any such device is satisfied, its sensing unit is inoperative or in open circuit condition. Each sensing unit Ya, Yb, Yc, etc., has one side connected to the hot side A of the AC line and its other side connected by a line 260a, 260b, 260c, etc., to the corresponding line 235a, 235b, 235c, etc., of the bank X of relay units Xa, Xb, Xc, etc.

Each relay unit, such as the relay unit Xa, includes a seal in relay 229a having one end of its winding 230a connected to a branch 231a of the line Ra leading to the controller 232a an interruptible or nonessential electrical service device Za, the use of which is not essential at all times and hence the current supply to which can be interrupted in accordance with the present invention to utilize the maximum "cheap" current (represented by the shaded area 14, FIG. 1) when the essential services do not demand the preset peak load (represented by the higher peak 11a of the graph, FIG. 1). The other side of this controller 232a of this interruptible service device Za is shown as connected to the return side B of the AC line. The other end of this winding 230a of the seal in relay 229a is connected to the line I which, as previously described, is under control of the armature 222 of relay 220, FIG. 5, which armature connects this end of the winding 221 with the return side B of the AC line. A normally open armature 233a of this seal in relay 229a is drawn into engagement with a contact at the end of another branch 234a of the line Ra leading to the controller of the interruptible electrical service device Za. This armature 233a is connected by a line 235a to the winding 236a of a relay 238a. A second armature 239a of the seal in relay 229a normally engages a contact 240a at the end of a line 241a, the opposite end of which is provided with a contact 242a normally engaged by another armature 243a of the relay 238a. This armtaure is connected with the hot side A of the AC line and is drawn into engagement with the contact 244a at one end of a line 245a. The armature 239a of the seal in relay 229a is drawn into engagement with the contact 246a at the opposite end of this line 245a.

The relay 238a has a second armature 250a connected with the line Oa from the stepper relay unit W. This armature is drawn into engagement with a contact 251a at the end of the line Ra leading to the controller 232a of the interruptible electrical service device Za.

The line N from one end of the winding 178 of the no improvement possible relay 179, FIG. 5, connects with the armature 239c of the seal in relay 229c of the last-in-line of the relay units Xa, Xb, Xc. The circuit to this line N is continued by a line 255 connecting the armature 243c of the relay 238c with the armature 243b of the relay 238b. This circuit is continued by a line 256 from the armature 239b of the seal in relay 229b to the armature 239a of the seal in relay 229a which, through the line 241a and armature 243a of relay 238a, completes this circuit to the hot side A of the AC line.

Operation

In setting the apparatus up for operation, the intercoupled swinging switch arms 94, 96 (FIG. 4) are engaged with that pair of contacts 92, 92a, etc., and 99, 99a, etc., respectively, which will place the line 12 (FIG. 1) at the desired level representing the maximum demand for billing which can be achieved with the use of interruptible services represented by the nonessential or interruptible service devices Za, Zb, etc. (FIGS. 2 and 6). Of course, in such setting the interruptible service devices Za, Zb, etc., cannot be starved out of useful service.

The electric power for the essential or noninterruptible services, as well as the power for the nonessential or interruptible service devices Za, Zb, etc. (FIGS. 2 and 6), is supplied through the three phase industrial power line 18, 19, 20 (FIGS. 2 and 3). The pickup coils 21, 22, 23 (FIGS. 2 and 3) surrounding each of these wires of the three phase lines, each producing an alternating current signal severally fed to the primary coils 24, 25, 26 of transformers 27, 28, 29 (FIG. 3) of the sensing unit U (FIGS. 2 and 3). The secondary coils 30, 31 and 32 of these transformers are in series with each other (FIG. 3) and in series with rectifiers 35, 36, 37 both to totalize the AC signals from the three phase power line 18, 19, 20 and to convert them into a DC signal across the output lines 33, 34 of the sensing unit U, a brute force filter 41 also being across these lines. This DC signal representing the total instantaneous kilowatt load is fed to the comparator V.

High and low voltages of fixed values, as well as filament current for the electronic tubes employed, is provided by the regulated DC power supply 50 (upper left FIG. 4). Thus, the primary winding 52 of the transformer 53 across the hot and return sides A and B of the AC power line has one secondary winding 54 supplying filament current and another secondary winding 55 supplying regulated high and low reference voltages. The output of the secondary winding 55 is converted into DC by series rectifiers 56, 59, a filter 61 and a gas filled tube 88 which dumps the current to the ground when its input voltage exceeds a set value. This input voltage provides, via a line 90, a high reference voltage to a high reference control twin triode 70, and current from the input to this gas filled tube 88 passing through the preselected one of the potentiometers 91, 91a, etc., to the grounded switch arm 94 provides a low reference voltage via line 95, the difference between these high and low reference voltages providing a dead band employed in the successive cutting into and out of service of the nonessential or interruptible service devices Za, Zb, etc., as hereinafter described.

Assuming that there is a light load on essential or noninterruptible services (not shown) then all of the interruptible or nonessential service devices Za, Zb etc. (FIGS. 2 and 6), will be in service and drawing current from the three phase supply lines 18, 19, 20. Such interruptible or nonessential service devices can be, for example, electric heat storage devices for air conditioning and other services, preheaters for the hot water used in quantity in an establishment, heaters for stair wells where variations in temperature are not important, motors for conveyors for moving bulk materials which can be deferred during high load demand periods, and many other services which do not have to be performed during peak demand periods for essential services. Such interruptible or nonessential services vary in their importance, so far as interruption is concerned, and it is one of the features of the invention to first cut out of service the least important of the interruptible or nonessential service devices Za, Zb, etc., and then progressively cut them out of service in inverse order to their importance and, conversely, as the essential or noninterruptible service kilowatt load decreases to cut these devices Za, Zb, etc., back into service in the order of their importance. In the circuit shown, the interruptible service device Za is the least important and the interruptible service device Zc is the most important, Zb being of intermediate importance.

Each of these interruptible service devices Za, Zb, etc., for example the device Za (FIG. 6) is supplied with power from the hot side A of the AC line via the sensor Ya for the companion interruptible or nonessential service device Za (which sensor could be a thermostat, pressure switch, photocell switch, time switch etc., depending on the nature of the interruptible service device Za) through lines 260a, 235a, armature 233a of energized seal in relay 229a (which is closed against contact 234a under the assumed light essential service load on the three phase power line 18, 19, 20) through line Ra to the controller 232a for the interruptible service device Za and to the return side B of the AC line.

If this interruptible service device Za (or any of the other interruptible service devices Zb, Zc, etc.) become satisfied (as by a heat storage device for air conditioning system being heated to the maximum called for by the sensor Ya) the sensor Ya (or Yb, Yc, etc.) this sensor closes this circuit to deenergize the companion controller 232a (or 232b, 232c, etc.).

In the following descritpion it will be assumed that the coupled or ganged switch arms 94, 96 (FIG. 4), have been set to establish the line 12 (FIG. 1) at 600 kilowatts. It will also be assumed that this setting is as shown in FIG. 4, namely, with the grounded swinging switch arm 94 engaging the contact 92 and the grounded swinging switch arm 97 engaging the contact 99. It will further be assumed that each of the nonessential or interruptible service devices Za, Zb, etc., is rated at 50 kilowatts. In addition it will be assumed that each of these nonessential or interrupitble service devices Za, Zb, etc., is asking for power, but not receiving power, that is, all the sensors Ya, Yb, etc., are closed but power from the three phase power supply lines 18, 19, 20 is not available due to a high essential service demand of more than 550 kilowatts. Under this last assumed condition it will be apparent that not even one of the 50 kilowatt interruptible or nonessential service devices Za, Zb, etc., can be cut into service without raising the total load above the 600 kilowatt level of line 12 (FIG. 1).

Also under this last assumed condition of an essential service load above 550 kilowatts, the DC voltage present in line 104 applied to the grid of the triode section 79 of the low reference twin triode 71 is above the fixed voltage applied to the companion grid of the triode section 78 of this twin triode 71, this low value fixed reference voltage for the grid of this triode section 78 being obtained, as previously described, from line 90 and potentiometer 91 from the positive side 90 of the regulated DC power supply 50. Also under this assumed condition of the above 550 kilowatt load, the voltage applied via line 104 directly from the output line 90 of the regulated DC power supply 50 to the control grid of the triode section 75 of the high reference twin triode 70 is below the fixed voltage being applied to the companion grid of the section 74 of this twin triode 70, this fixed reference voltage for the grid of this triode section 74 being obtained, as previously described, via line 90 directly from the positive side 90 of the regulated DC power supply 50. The fixed high reference voltage applied to grid of the triode section 74 of the high reference twin triode 70 as compared with the fixed low reference voltage aplied to the grid of the triode section 78 of the low reference twin triode 71 is a function of the potentiometer 91 which is grounded through the swinging switch arm 94 and resistor 96. This dead band difference in the reference voltages applied to the grids of the triode sections 74 and 78 of the high and low reference twin triodes 71 and 70 preferably corresponds to slightly more than one 50 kilowatt increment change in the total load on the power lines 18, 19, 20.

Under this assumed condition of above 550 kilowatt essential service load, the twin triodes 70, 71, together with their series aiding rectifiers and grounded cathode resistors, each acts as a so-called diode gate to impress a negative voltage on the grids of the triode sections 81 and 84 of the twin triodes 72 and 73 so as to bias them to cut-off, due to the shunting effect of these diode gates, of the signal from the line G.

Thus under this assumed condition of about 550 kilowatt load, both of these diode gating circuits act to effectively short circuit the signal voltage from this line G to ground. With the twin triode 70, this shunting or short circuit of the signal from the line G to ground is through half of the resistor 118, lines 113, 112, rectifier 111 and resistor 106 to ground. With the twin diode 71, this shunting or short circuit of the signal from the line G to ground is through the other half of resistor 118, lines 123, 122, rectifier 120 and resistor 108 to ground.

Accordingly no signal from the line G reaches the grids of the triode sections 81 or 84 of the high and low reference relay switching twin triodes 72, 73. These grids, without this signal voltage from G, are biased to cut-off by the negative voltage from line F connecting with the negative side 60 of the regulated DC power supply 50. Accordingly no signal is coupled through the triode sections 81 and 84 to the grids of the triode sections 82 and 85 of these twin triodes. As a result, the negative bias voltage from the line F on the grids of these triode sections 82 and 85 biases these triode sections to cut-off thereby allowing no plate current to flow through the relays 150 and 173. With the assumed condition of more than 550 kilowatts, these relays are deenergized and in the condition shown in FIG. 4 with the normally open relay 150 being open and with the armature 176 of the relay 173 connecting the AC power supply line A through line 177 to the line D.

Accordingly AC power, FIG. 5, is applied through line 200 and the heating element 219 of the thermally operated time delay switch 201 to the AC return line B. Since this heating element is associated with the normally closed thermally operated time delay switch 201, its energization holds open the contacts of this switch. Accordingly, except for rendering the thermally operated time delay switch 201 inoperative, the AC power so applied to line 200 has no function. The reason for this condition is that since the essential or noninterruptible services call for more than 550 kilowatts, none of the 50 kilowatt nonessential or interruptible service devices Za, Zb, or Zc can be cut into service without exceeding the set 600 kilowatt load represented by the line 12, FIG. 1, this being an important object of the monitoring device.

If now the total kilowatt load drops to less than the assumed 550 kilowatts, it is apparent that 50 kilowatts are available for one of the nonessential or interruptible service devices Za, Zb or Zc (all of which are assumed to be calling for power that are unsatisfied) without exceeding the said 600 kilowatt level 12 (FIG. 1). Accordingly the apparatus now cuts one of these interruptible service devices into operation, this being the most important one, namely, the interruptible service device Zc. This cutting into service of the most important interruptible service device Zc is effected as follows:

Since, as previously described the DC signal from the sensing unit U (FIG. 3) is proportional to the total instantaneous kilowatt load, this assumed drop in the total kilowatt load to below 550 kilowatts results in a proportionally lower DC voltage across the lines 33 and 34 (upper right, FIG. 4) and across the operative potentiometer 100 and switch arm 97 through line 104 to the control grids of the triode sections 75 and 79 of the high and low reference twin triodes 70 and 71. This lowers the voltage on the grid of the triode section 75 of the high reference twin triode 70, this being without effect since it only serves to increase the shunting effect of this diode gate which is already shut off. However, this also lowers the voltage applied to the grid of the triode section 79 of the low reference triode 71 to the value of the fixed DC reference low voltage applied, from the negative side of the DC power regulator 50, to the companion grid of the triode section 78 of this twin triode. Since the plate voltage applied to both plates of this low reference twin triode 71 is equal, and since the voltage applied to the grids of this low reference twin triode 71 have now been brought to equality, by this falling voltage of line 104, the voltage drop across the two resistors 108, 109 is now equal. With such equality no forward bias current flows in the diode gate circuit comprising the resistor 109, rectifiers 121, and 120 and resistor 108 and hence the junction 122 between the rectifiers 121 and 120 becomes a high impedance to flow of current from the line G through the resistor 118 and line 123; and thence through the rectifier 120 and resistor 108 to ground. Accordingly the AC signal from line G through resistor 118 is impressed on the grid of the triode section 84 of the low reference relay switching twin triode 73 and the positive part of this signal renders this triode section 84 conductive. The pulsating positive DC plate current resulting from so rendering this triode section 84 conductive is impressed on the grid of the triode section 85 of this low reference relay switching twin triode to render this triode section 85 conductive. Accordingly current from the line H (connected with the positive side of the DC power supply 50) flows through the winding 172 of the relay 173, line 171 and triode section 85 to ground. Energizing the relay 173 pulls its armature 176 into engagement with and supplies AC power from line A to line C. At the same time this armature cuts off the flow of current from the AC power supply line A to the line D.

Accordingly AC power, FIG. 5, is applied through the armature 182 of the no improvement possible relay 179 to energize the electric motor 183, the other side of this motor being connected to the AC power return B. The cam 184 driven by this electric motor rotated to close and open the microswitch 185. Accordingly on such closing AC power line A passes through armature 189 of relay 188, line 190, closed microswitch 185 and through the advance coil 191 of the step-by-step solenoid switch 192. This swings the switch arm 193 of this switch from the dead contact 194 to the contact 195c. A single energizing impulse through the advance coil 191 moves the switch arm 193 from one contact to the next contact.

Under this condition AC power from the line A passes through armature 203 of deenergized reset relay 188, line 205, switch arm 193, contact 195c and line Oc to the armature 250c, FIG. 6, of relay 238c.

Under the assumed condition (all of the nonessential or interruptible service devices Za, Zb, Zc inoperative but calling for power) this relay 238c is energized. This energization is due to the fact that the nonessential or interruptible service device Zc (FIGS. 2 and 6) is unsatisfied and hence its sensor Yc is calling for power and closed. With this sensor closed, AC power from line A passes through line 260c and winding 236c of relay 238c to AC power return B. This draws the armature 250c into engagement with the contact 251c and since AC power is now being supplied to this armature 251c, AC power is supplied through line Rc to the controller 232c of the nonessential or interruptible service device Zc to energize this device.

Simultaneously winding 230c of the seal in relay 229c is energized via line 231c (FIG. 6), winding 230c of this relay, line I, armature 222 (upper right, FIG. 5) of now deenergized reset relay 220 to AC power return B. This energization of this seal in relay 229c pulls its armature 233c into engagement with the contact 234c to provide a holding circuit for the reset relay 229c. Thus under this condition AC power from line A is supplied through closed sensor Yc, lines 260c and 235c armature 233c, contact 234c, line 321c, winding 230c, line I and armature 222 of deenergized reset relay 220 (FIG. 5) to AC power return B.

This holds the controller 232c (FIG. 4) operative to energize the nonessential or interruptible service device Zc while at the same time permitting the switch arm 193 of the step-by-step solenoid switch 192 (FIG. 5) to leave the contact 195c and either advance on to engage the contacts 195b and 195a or return to the dead contact 194. With the present assumed condition that is the most important nonessential or interruptible service device Zc adding a 50 kilowatt demand increased to the total demand load to carry this total demand load above 550 kilowatts (but less than 600 kilowatts) this movement of this switch arm 193 (FIG. 5) is a return movement to engage the dead contact 194. This movement is brought about as follows:

This energization of the nonessential or interruptible service device, Zc causes the power demand to rise to above 550 kilowatts thereby, through the sensing unit U, FIGS. 2 and 3, to provide a proportionate increased DC voltage across lines 33 and 34, thereby, through the potentiometer 100 and line 104, to increase the positive potential on the grids of the triode sections 75 and 79 of the twin triodes 70 and 71. This raises the potential of the grid of the triode section 79 above that of the companion grid of the triode section 78 thereby to increase the current through and voltage drop across the resistor 109 above that of the resistor 108 thereby to render the two rectifiers 120, 121 conductive and to short the AC signal from G to ground, is previously described, and to permit the negative bias from F to regain control and cut off the triode section 84 of the low reference relay switching twin triode 73. Since this cuts off the pulsating DC signal through and the capacitor 170 to the grid of the triode section 85 of this twin triode 73, the negative bias from F regains control of the twin triode section 85 to deenergize the winding of the relay 173. This restores the armature 176 to supply power from the AC power supply line A to the balance voltage line D.

As previously described AC power from this balanced voltage line D (FIG. 5) passes through line 200 and closed contacts of the thermally operated time control switch 201, line 202, and winding 186 of the reset relay 188 to the AC power return B. This pulls the armature 189 into engagement with contact 208 to establish a circuit from the AC power supply line A, armature 189 of reset relay 188, line 209 to return coil 210 of the step-by-step solenoid switch 192. This draws the switch arm 193 back to the dead contact 194.

When the resistance heater 219 heats the thermally operated time delay switch 201 to open its contacts, this circuit is broken to cut the return coil 210 of the step-by-step solenoid switch out of service.

If now the essential or noninterruptible load continues to drop so that the total load falls below the assumed 550 kilowatts, it is apparent that another 50 kilowatts are available for another of the nonessential or interruptible service devices Zb or Za (both of which are assumed to be calling for power, that is are unsatisfied) without exceeding the 600 kilowatt level 12 (FIG. 1). Accordingly the apparatus now cuts one of these additional interruptible service devices into operation, thus being the next most important one, namely, the interruptible service device Zb. This cutting of this next most important interruptible service device Zb into service is effected as follows:

Since, as previously described the DC signal from the sensing unit U (FIG. 3) is proportional to the total instantaneous kilowatt load, this assumed drop in the total kilowatt load to below 550 kilowatts results in a proportionally lower DC voltage across the lines 33 and 34 (upper right, FIG. 4) and across the operative potentiometer 100 and switch arm 97 through line 104 to the control grids of the triode sections 75 and 79 of the high and low reference twin triodes 70 and 71. This lowers the voltage on the grid of the triode section 75 of the high reference twin triode 70, this being without effect since it only serves to increase the shunting effect of this diode gate which is already shut off. However, this also lowers the voltage applied to the grid of the triode section 79 of the low reference triode 71 to the value of the fixed DC reference low voltage applied, from the negative side of the DC power regulator 50, to the companion grid of the triode section 78 of this twin triode. Since the plate voltage applied to both plates of this low reference twin triode 71 is equal, and since the voltage applied to the grids of this low reference twin triode 71 have now been brought to equality, by this falling voltage of line 104, the voltage drop across the two resistors 108, 109 is now equal. With such equality no forward bias current flows in the diode gate circuit comprising the resistor 109, rectifiers 121 and 120 and resistor 108 and hence the junction 122 between the rectifiers 121 and 120 becomes a high impedance to flow of current from the line G through the resistor 118 and line 123, and thence through the rectifier 120 and resistor 108 to ground. Accordingly the AC signal from line G through resistor 118 is impressed on the grid of the triode section 84 of the low reference relay switching twin triode 73 and the positive part of this signal renders this triode section 84 conductive. The pulsating positive DC plate current resulting from so rendering this triode section 84 conductive is impressed on the grid of the triode section 85 of this low reference relay switching twin triode to render this triode section 85 conductive. Accordingly current from the line H (connected with the positive side of the DC power supply 50) flows through the winding 172 of the relay 173, line 171 and triode section 85 to ground. Energizing the relay 173 pulls its armature 176 into engagement with and supplies AC power from line A to line C. At the same time this armature cuts off the flow of current from the AC power supply line A to the line D.

Accordingly AC power, FIG. 5, is applied through the armature 182 of the no improvement possible relay 179 to energize the electric motor 183, the other side of this motor being connected to the AC power return B. The cam 184 driven by this electric motor rotates to close and open the microswitch 185. Accordingly on such closing AC power from line A passes through armature 189 of relay 188, line 190, closed microswitch 185 and through the advance coil 191 of the step-by-step solenoid switch 192. This swings the switch arm 193 of this switch from the dead contact 194 to the contact 195c.

However, now the line Oc from this contact 195c is energized (backfeed, FIG. 6, from A, closed sensor Yc, lines 260 and 235c, armature 233c of energized seal in relay 229c, line Rc, contact 251c, armature 250c of energized relay 238c and to this line Oc) so nothing happens as a result of this contact by switch arm 193 with this live contact 195c. Accordingly the motor 183 continues to run and through its cam 186 closes and opens the microswitch 185. On such closing, as previously described, AC power from supply line A passes through armature 189 of reset relay 188, line 190, closed microswitch 185 and through the advance coil 191 of the step-by-step solenoid switch 192. This swings the switch arm 193 of the switch from the live contact 195c to the next contact 195b.

Under this condition AC power from the line A passes through armature 203 of the deenergized reset relay 188, line 205, switch arm 193, contact 195b and line Ob, to armature 250b, FIG. 6, of relay 238b.

Under the assumed condition (the nonessential service device Zc receiving power and Zb and Za inoperative and calling for power) this relay 238b is energized. This energization is due to the fact that the nonessential or interruptible service device Zb (FIGS. 2 and 6) is unsatisfied and hence its sensor Yb is calling for power and closed. With this sensor closed, AC power from the supply side A passes through line 260b and winding 236b of relay 238b to AC power return B. This draws the armature 250b into engagement with the contact 251b and since AC power is now being supplied to this armature 250b, AC power is supplied through line Rb to the controller 232b of the nonessential or interruptible service device Zb to energize this device.

Simultaneously the seal in relay 229b is energized via line 231b (FIG. 6), coil 230b of this seal in relay, line I armature 222 (upper right, FIG. 5) of now deenergized reset relay 220 to the AC return line B. This energization of this seal in relay 229b pulls its armature 233b into engagement wtih the contact 234b to provide a holding circuit for the relay 229b. Under this condition AC power from line A is supplied through closed sensor Yb, lines 260b and 235b, armature 233b, contact 234b, line 231b, winding 230b, line I and armature 222 of deenergized reset relay 220 (FIG. 5) and AC return B.

This holds the controller 232b (FIG. 4) operative to energize the nonessential or interruptible service device Zb while at the same time permitting the switch arm 193 of the step-by-step solenoid switch 192 (FIG. 5) to leave the contact 195b and either advance on to engage the contact 195a or return to the dead contact 194. With the present assumed condition, that is, the two more important interruptible service devices Zc and Zb adding a 100 kilowatt demand increment to the total demand load to carry this total demand load above 550 kilowatts (but less than 600 kilowatts), thus movement of this switch arm 193 (FIG. 5) is a return movement to engage the dead or start contact 194. This movement is brought about as follows:

The energization of the interruptible or nonessential service device Zb causes the power demand to rise to above 550 kilowatts, thereby, through the sensing unit U, FIGS. 2 and 3, to provide a proportionate increased DC voltage across lines 33 and 34, thereby through the potentiometer 100, and line 104, to increase the positive potential on the grids of the triode sections 75 and 79 of the twin triodes 70 and 71. This raises the potential of the grid of the triode section 79 above that of the companion grid of the triode section 78 thereby to increase the current through and voltage drop across the resistor 109 above that of the resistor 108 thereby to render the two rectifiers 120, 121, conductive and to short the AC signal from G to ground, as previously described, and to permit the negative bias from F to regain control and cut off the triode section 84 of the low reference relay switching twin triode 73. Since this cuts off the pulsating DC signal through and the capacitor 170 to the grid of the triode section 85 of this twin triode 73, the negative bias from F regains control of the twin triode section 85 to deenergize the winding of the relay 173. This restores the armature 176 to supply power from the AC power supply line A to the balance voltage line D.

As previously described AC power from this balanced voltage line D (FIG. 5) passes through line 200 and closed contacts of the thermally operated time control switch 201, line 202 and winding 186 of the reset relay 188 to the AC power return B. This pulls the armature 189 into engagement with contact 208 to establish a circuit from the AC power supply line A, armature 189 of reset relay 188, line 209 to return coil 210 of the step-by-step solenoid switch 192. This draws the switch arm 193 over the live contact 195c back to the dead contact 194.

When the resistance heater 219 heats the thermally operated time delay switch 201 to open its contacts, this circuit is broken to cut the return coil 210 of the step-by-step solenoid switch out of service.

If now the essential or noninterruptible load continues to drop so that the total load falls below the assumed 550 kilowatts, it is apparent that another 50 kilowatts are available for the last nonessential or interruptible service devices Za (which, as assumed, is still calling for power or unsatisfied) without exceeding the 600 kilowatt level 12 (FIG. 1). Accordingly the apparatus now cuts this last or least important of these interruptible service devices into operation, as follows:

Since, as previously described the DC signal from the sensing unit U (FIG. 3) is proportional to the total instantaneous kilowatt load, this assumed drop in the total kilowatt load to below 550 kilowatts results in a proportionally lower DC voltage across the lines 33 and 34 (upper right, FIG. 4) and across the operative potentiometer 100 and switch arm 97 through line 104 to the control grids of the triode sections 75 and 79 of the high and low reference twin triodes 70 and 71. This lowers the voltage on the grid of the triode section 75 of the high reference twin triode 70, this being without effect since it only serves to increase the shunting effect of this diode gate which is already shut off. However, this also lowers the voltage applied to the grid of the triode section 79 of the low reference triode 71 to the value of the fixed DC reference low voltage applied from the negative side of the DC power regulator 50, to the companion grid of the triode section 78 of this twin triode. Since the plate voltage applied to both plates of this low reference twin triode 71 is equal, and since the voltage applied to the grids of this low reference twin triode 71 have now been brought to equality, by this falling voltage of line 104, the voltage drop across the two resistors 108, 109 is now equal. With such equality no forward bias current flows in the diode gate circuit comprising the resistor 109, rectifiers 121 and 120, and resistor 108 and hence the junction 122 between the rectifiers 121 and 120 becomes a high impedance to flow of current from the line G through the resistor 118 and line 123, and thence through the rectifier 120 and resistor 108 to ground. Accordingly the AC signal from line G through resistor 118 is impressed on the grid of the triode section 84 of the low reference relay switching twin triode 73 and the positive part of this signal renders this triode section 84 conductive. The pulsating positive DC plate current resulting from so rendering this triode section 84 conductive is impressed on the grid of the triode section 85 of this low reference relay switching twin triode to render this triode section 85 conductive. Accordingly current from the line H (connected with the positive side of the DC power supply 50) flows through the winding 172 of the relay 173, line 171 and triode section 85 to ground. Energizing the relay 173 pulls its armature 176 into engagement with and supplies AC power from line A to line C. At the same time this armature cuts off the flow of current from the AC power supply line A to the line D.

Accordingly AC power, FIG. 5, is applied through the armature 182 of the no improvement possible relay 179 to energize the electric motor 183, the other side of this motor being connected to the AC power return B. The cam 184 driven by this electric motor rotates to close and open the microswitch 185. Accordingly on such closing AC power from line A passes through armature 189 of relay 188, line 190, closed microswitch 185 and through the advance coil 191 of the step-by-step solenoid switch 192. This swings the switch arm 193 of this switch from the dead contact 194 to the contact 195c.

However, now both the line Oc and Ob from the contacts 195c and 195b respectively, are energized (back feed, FIG. 6, from A, closed sensors Yc, Yb, lines 260c, 235c and 260b, 235b, armature 233c and 233b of energized seal in relays 229c and 229b, lines Rc and Rb, contacts 251c and 251b of energized relays 238c and 238b and to these lines Oc and Ob), so nothing happens as a result of the contact with these live contacts 195c and 195b, the motor 183 continuing to run and move the switch arm 193 (through the periodic energization of the advance coil 191 by periodic closing of the microswitch 185) until its reaches the dead contact 195a.

Under this condition, AC power from the supply side A passes through armature 203 of the deenergized reset relay 188, line 205, switch arm 193, contact 195a and line Oa to armature 250a, FIG. 6, of relay 238a.

Under the now assumed condition (the nonessential service devices Zc and Zb receiving power and Za inoperative and calling for power) this relay 238a is energized. This energization is due to the fact that the nonessential or interruptible service device Za (FIGS. 2 and 6) is unsatisfied and hence its sensor Ya is calling for power and closed. With this sensor closed, AC power from the supply side A of the AC line passes through line 260a and winding 236a of relay 238a to the AC power return B.

This draws the armature 250a into engagement with the contact 251a and since AC power is now being supplied to this armature 250a, AC power is supplied through line Rb to the controller 232a of the nonessential interruptible service device Za to energize this device.

Simultaneously the seal in relay 229a is energized via line 231a (FIG. 6), coil 230a of this seal in relay, line I, armature 222 (upper right, FIG. 5) of now deenergized reset relay 220 to the AC return line B. This energization of this seal in relay 229a pulls its armature 233a into engagement with the contact 234a to provide a holding circuit for the relay 229a. Under this condition AC power from supply line A is supplied through closed sensor Ya, lines 260a and 235a, armature 233a, contact 234a, line 231a, winding 230a, line I and armature 220 (FIG. 5) to AC return B.

This holds the controller 232a (FIG. 4) operative to energize the nonessential or interruptible service device Za while at the same time permitting the switch arm 193 of the step-by-step solenoid switch 192 (FIG. 5) to leave the contact 195a and either advance on to engage the contact 198 or return to the dead contact 194. With the present assumed condition, that is all of the interruptible service devices Zc, Zb and Za adding a 150 kilowatt demand increment to the total demand load to carry this total demand load above 550 kilowatts (but less than 600 kilowatts), this movement of this switch arm 193 (FIG. 5) is a return movement to engage the dead or start contact 194. This movement is brought about as follows:

The energization of the interruptible or nonessential service device Za causes the power demand to rise above 550 kilowatts, thereby, through the sensing unit U, FIGS. 2 and 3, to provide a proportionate increased DC voltage across lines 33 and 34, thereby, through the potentiometer 100, and line 104, to increase the positive potential on the grids of the triode sections 75 and 79 of the twin triodes 70 and 71. This raises the potential of the grid of the triode section 79 above that of the companion grid of the triode section 78 thereby to increase the current through and voltage drop across the resistor 109 above that of the resistor 108 thereby to render the two rectifiers 120, 121 conductive and to short the AC signal from G to ground, as previously described, and to permit the negative bias from F to regain control and cut off the triode section 84 of the low reference relay switching twin triode 73. Since this cuts off the pulsating DC signal through the capacitor 170 to the grid of the triode section 85 of this twin triode 73, the negative bias from F regains control of the twin triode section 85 to deenergize the winding of the relay 173. This restores the armature 176 to supply power from the AC power supply line A to the balance voltage line D.

As previously described AC power from this balance voltage line D (FIG. 5) passes through line 200 and closed contacts of the thermally operated time control switch 201, line 202 and winding 186 of the reset relay 188 to the AC power return B. This pulls the armature 189 into engagement with contact 208 to establish a circuit from the AC power supply line A, armature 189 of reset relay 188, line 209 to return coil 210 of the step-by-step solenoid switch 192. This draws the switch arm 193 over the live contacts 195b and 195c back to the dead contact 194.

When the resistance heater 219 heats the thermally operated time delay switch 201 to open its contacts, this circuit is broken to cut the return coil 210 of the step-by-step solenoid switch out of service.

Assuming now, with all of the interruptible or nonessential service devices Zc, Zb, and Za in service and receiving power, the essential or noninterruptible service demand rises with any degree of rapidity, to the 600 kilowatt instantaneous demand set by selection of the potentiometer 100, FIG. 4, and represented by the horizontal dotted line 12, FIG. 1, the monitoring device of the present invention responds instantaneously to cut all of the nonessential or interruptible service devices out of service, this being effected as follows:

Such rise of the instantaneous kilowatt demand, through the sensing unit U, FIGS. 2 and 3, increases the DC voltage across the lines 33 and 34 thereby, through the potentiometer 100 and line 104, to increase the positive potential on the grids of the triode sections 75 and 79 of the high and low reference twin triodes 70 and 71. This raises the potential of the grid of the triode section 75 of the high reference twin triode 70 to equal the grid voltage of the triode section 74 applied from the positive side of the regulated DC power supply 50 via line 90. Since the plate voltage applied to both plates of this high reference twin triode 70 is equal, and since the voltage applied to the grids of this high reference twin triode 70 have now been brought to equality, by this rising voltage of line 104, the voltage drop across the two resistors 105 and 106 is now equal. With such equality no forward bias current flows in the diode gate circuit comprising the resistor 105, rectifiers 110 and 111 and resistor 106 and hence the junction 112 between the rectifiers 110 and 111 becomes high impedance to flow of current from the line G through the resistor 118 and line 113, and thence through the rectifier 111 and resistor 106 to ground. Accordingly the AC signal from line G through the resistor 118 is impressed on the grid of the triode section 81 of the high reference relay switching twin triode 72 and the positive part of this signal renders this triode section 81 conductive. The pulsating positive DC current resulting from so rendering this triode section 81 conductive is impressed through capacitor 145 and line 146 on the grid of the triode section 82 of the high reference relay switching twin triode 72 to render this triode section 82 conductive. Accordingly current from the line H (connected with the positive side of the DC power supply 50) flows through the winding 149 of relay 150, line 148 and triode section 82 to ground. Energizing the relay 150 pulls its armature 153 into engagement with and supplies AC power from line A to line E.

Referring to upper right of FIG. 5, power from line E energizes the winding 221 of the relay 220, the other side of this winding being connected to AC return B. One affect of so energizing this relay 220 is the deenergizing of all of the nonessential or interruptible service to devices Zc, Zb, Za by breaking the circuit from line I to the AC return line B through opening the armature 222. Referring to FIG. 6, this deenergizes all of the windings 230c, 230b and 230a of relays 229c, 229b and 229a to break the holding circuits maintaining these relays energized. Confining attention to the circuit of the nonessential or interruptible service device Zc (the same description applying to the circuits of the devices Zb and Za applying the subscripts b and a) this holding circuit is broken by breaking contact between armature 233c and contact 234c thereby breaking the holding circuit from the AC supply line A, through sensor Yc through the controller 232c to the AC return B.

Accordingly all of the interruptible or nonessential service devices are now rendered inoperative to prevent their functioning from raising the demand load above the set 600 kilowatts represented by line 12 of FIG. 1. It is important to note, however, that this does not prevent the noninterruptible or essential service demand load from rising to any value so that essential services can never be throttled by the present monitoring device.

Another effect of so energizing this relay 220, FIG. 5, is, if the switch arm 193 of the step-by-step solenoid switch 192 is on a contact other than the dead contact 194, such energization will return it to this dead contact. This is so that the switch arm always starts from this dead contact so as to assure applying any available power (below 550 kilowatt total load) to the nonessential or interruptible service devices in the order of their importance. Thus this energization of the winding 221 of relay 220 pulls its armature 225 to supply AC power from line A through lines 228 and 200, thence through both the closed contacts and the heater 219 of the thermally operated time delay switch 201, and winding 186 of the reset relay 188 to the AC return B. This causes AC power from supply side A to pass through armature 189, line 209, return coil 210 of step-by-step solenoid switch 192 to the AC return B. This moves the switch arm 193 in a clockwise direction toward the dead contact 194. The heater 219 is timed so to never be effective until the switch arm 193 reaches the dead contact 194. This heater, however, ultimately cuts power off the reset relay 220 and return coil 210 of the step-by-step solenoid switch 192 as previously described.

After so rendering all of the nonessential or interruptible service devices inoperative, the next action of the monitoring device will be determined by the demand of the essential or noninterruptible services combined with the power called for by any sensor $Yc$, $Yb$, $Ya$ of the nonessential or interruptible service devices $Xc$, $Xb$ or $Xa$.

For example, with all of the interruptible or nonessential service devices so rendered inoperative by such rising of the total kilowatt demand load to the 600 kilowatt instantaneous demand set by the relation of the potentiometer 100, let us assume one of these nonessential or interruptible service devices, say, the device $Zb$, is not calling for power so that its sensor $Yb$ is open. Let us also assume that the essential service instantaneous demand drops below 500 kilowatts. With such drop of the total load to less than 500 kilowatts, it is apparent that 50 kilowatts are available for each of the two nonessential or interruptible service devices $Zc$ and $Za$ whose sensors $Yc$ and $Ya$ are still asking for power. Accordingly the monitoring device now cuts into operation first the most important nonessential or interruptible service device $Zc$ and then the less important device $Za$ as follows:

As previously described such drop in the total kilowatt load (to les than 500 kilowatts) results in a proportionately lower DC voltage, across the lines 33 and 34 (upper right, FIG. 4) and across the operative potentiometer 100 and switch arm 197 through line 104 to the control grids of the triode sections 75 and 79 of the high and low reference twin triodes 70 and 71. This lowers the voltage on the grid of the triode section 75 of the high reference twin triode 70, this being without effect since it only serves to increase the shunting effect of this diode gate which is already shut off. However, this also lowers the voltage applied to the grid of the triode section 79 of the low reference triode 71 to the valve of the fixed DC reference low voltage applied from the negative side of the DC power regulator 50, to the companion grid of the triode section 78 of this twin triode. Since the plate voltage applied to both plates of this low reference twin triode 71 is equal, and since the voltage applied to the grids of this low reference twin triode 71 have now been brought to equality, by this falling voltage of line 104, the voltage drop across the two resistors 108, 109 is now equal. With such equality no forward bias current flows in the diode gate circuit comprising the resistor 109, rectifiers 121 and 120 and resistor 108 and hence the junction 122 between the rectifiers 121 and 120 becomes a high impedance to flow of current from the line G through the resistor 118 and line 123, and thence through the rectifier 120 and resistor 108 to ground. Accordingly the AC signal from line G through resistor 118 is impressed on the grid of the triode section 84 of the low reference relay switching twin triode 73 and the positive part of this signal renders this triode section 84 conductive. The pulsating positive DC plate current resulting from said rendering this triode section 84 conductive is impressed on the grid of the triode section 85 of this low reference relay switching twin triode to render this triode section 85 conductive. Accordingly current from the line H (connected with the positive side of the DC power supply 50) flows through the relay winding 172 of the relay 173, line 171 and triode section 85 to ground. Energizing relay 173 pulls its armature 176 into engagement with and supplies AC power from line A to line C. At the same time this armature cuts off the flow of current from the AC power supply line A to the line D.

Accordingly AC power, FIG. 5, is applied through the armature 182 of the no improvement possible relay 179 to energize the electric motor 183, the other side of this motor being connected to the AC power return B. The cam 184 driven by this electric motor rotates to close and open the microswitch 185. Accordingly on such closing AC power from line A passes through armature 189 of relay 188, line 190, closed microswitch 185 and through the advance coil 191 of the step-by-step solenoid switch 192. This swings the switch arm 193 of the switch from the dead contact 194 to the contact 195c. A single energizing impulse through the advance coil 191 moves the switch arm 193 from one contact to the next contact.

Under this condition AC power from the line A passes through armature 203 of deenergized reset relay 188, line 205, switch arm 193, contact 195c and line Oc to the armature 250c, FIG. 6, of relay 238c.

Under the assumed condition of the interruptible or non-essential service devices $Zc$ and $Za$ calling for power, this relay 238c is energized. This energization is due to the fact that the nonessential or interruptible service device $Zc$ (FIGS. 2 and 6) is unsatisfied and hence its sensor $Yc$ is calling for power and closed. With this sensor closed, AC power from line A passes through line 260c and winding 236c of relay 238c to AC power return B. This draws the armature 250c into engagement with the contact 251c and since AC power is now being supplied to this armature 251c, AC power is supplied through line Rc to the controller 232c of the nonessential or interruptible service device $Zc$ to energize this device.

Simultaneously winding 230c of the seal in relay 229c is energized via line 231c (FIG. 6), winding 230c of this relay, line I, armature 222 (upper right, FIG. 5) of now deenergized reset relay 220 to AC power return B. This energization of this seal in relay 229c pulls its armature 233c into engagement with the contact 234c to provide a holding circuit for the reset relay 229c. Thus under this condition AC power from line A is supplied through closed sensor $Yc$, lines 260c and 235c, armature 233c, contact 234c, line 321c, winding 230c, line I and armature 222 of deenergized reset relay 220 (FIG. 5) to AC power return B.

This holds the controller 232c (FIG. 4) operative to energize the nonessential or interruptible service device $Zc$ while at the same time permitting the switch arm 193 of the step-by-step solenoid switch 192 (FIG. 5) to leave the contact 195c and advance to the contact 195b.

The motor 183 is still operative and hence is closing and opening the microswitch 185 by its cam 184. This closes a circuit from A, armature 203 of open relay 188, line 190, closed microswitch 185, and advance coil 191 of the step-by-step switch 192 to the AC return B. This energization of the advance coil 191 causes the switch arm 193 to advance to the contact 195b but since the sensor $Yb$ (FIG. 6) is open (its nonessential or interruptible service device $Zb$ is not calling for power) this contact 195b is dead.

Thus with this sensor $Yb$ open, the relay 238b is deenergized and hence its armature 250b is not connected with contact 251b. Accordingly no power from the switch arm 193, contact 195b, line Ob can reach either the controller 232b or the seal in relay 229b.

The motor 183 is still operative and causes the switch arm 193 to advance to engage the contact 195a.

Because the sensor $Ya$ is calling for power, relay 238a is energized thus connecting armature 250a to contact 251a. Since the switch arm 193 is connected, as previously described, to the AC power line A, it now supplies power both to the controller 232a and to the coil of the seal in relay 229a to render the interruptible or nonessential service device Za operative.

With such cutting into service of the two 50 kilowatt nonessential or interruptible service devices Zc and Za, the total demand increases to between 550 and 600 kilowatts. The DC signal from the sensing unit U, increases proportionately and, as previously described, causes the lower reference twin triodes 71 and 73 to become cut off or nonconducting, thus deenergizing the winding of relay 173. This causes its armature 176 to engage line D. Such energization of line D energizes, as previously described, reset relay and return coil 210 of the step-by-step solenoid switch 192 to return its switch arm 193 to the dead contact 194.

It will now be noted that the interruptible or nonessential service devices Za and Zc are calling for power and are being supplied and that the interruptible or nonessential service device Zb is not calling for power. Accordingly all of the interruptible or nonessential service devices are being satisfied. This is a no improvement possible situation. For example, even if additional power becomes available to be put to use it cannot be put to use because there is no place to put it. It is obvious that the step-by-step solenoid switch 192 should be rendered inoperable to avoid unnecessary wear upon it. This is accomplished by the no improvement possible relay 179 as follows.

The winding 178 of no improvement possible relay 179 is served by AC power originating at A, upper left FIG. 6, through armature 243a, line 241a or 245a, armature 239a, line 256, armature 239b, line 241b or 245b, armature 243b, line 255, armature 243c, line 241c or 245c, armature 239c, and line N to this winding 178 to the AC return B. It will be noted that if any of the sensors Y (a, b or c) is not asking for power, its relay 238 (a, b or c) is not energized nor is its relay 229 (a, b or c) energized and thus a circuit is made via lines 241 (a, b and c). If any sensor Y (a, b or c) is calling for power and its associated interruptible or nonessential device Z (a, b or c) is receiving power, its relays 238 (a, b or c) and 229 (a, b or c) are energized and a circuit is made through lines 245 (a, b and c).

Thus with a satisfied situation, no improvement possible relay 179 is energized and its armature 182 is disconnected from the motor 183. Accordingly the motor is rendered inoperative to advance the switch arm 193 regardless of whether or not line C is supplied with AC power.

Contact 198 and line 199 connecting to line 200 are provided for the contingency that if the swinging switch arm 193 ever reaches this end or forward point, it will cause itself to return to the dead contact 194 as follows.

Under such circumstances, this swinging switch arm 193 would be energized with AC power from the power supply side A of the AC line, armature 203, contact 204 and line 205. With this swinging switch arm 193 engaged with contact 198, AC power would therefore be supplied via lines 199 and 200, normally closed contacts of the thermally operated time switch 201, and winding 186 of reset relay 188 to the return side B of the AC line. This would pull armature 189 to engage contact 208 and supply AC power from the source or line A, armature 189, contact 208, line 209 and return coil 210 of the step-by-step solenoid switch 192 to the AC return line B. This would draw the swinging switch arm 193 back to the contact 195a and into the interaction of the contacts 195c, 195b and 195a, as previously described, in returning the switching arm to the dead start contact 194 following its action in searching for and satisfying any unsatisfactory interruptible service devices when sufficient "cheap" current (shaded area below line 12, FIG. 1) is available for such purpose.

An important feature of the invention resides in the action of the monitoring device to permit the essential or noninterruptible service load to rise without impedance to any value for the obvious reason that such service must not be throttled at any time. For example, assume all of the interruptible or nonessential service devices Zc, Zb and Za cut out of service, as by the action of the monitoring device in holding the demand below the assumed 600 kilowatt level 12, FIG. 1, or otherwise. If now the essential or noninterruptible service demand continues to rise, it will carry the instantaneous demand above the 600 kilowatts set by the selection of the potentiometer 100, FIG. 4, and represented by the dotted line 12, FIG. 1. The monitoring device of the present invention does not inhibit such rise because of the monitoring device has nothing to do with the essential or noninterruptible demand. Accordingly, if such demand continues for more than the fifteen minute period assumed to be the base for billing, a new demand peak for billing purposes has been set and the customer must pay for the increased base used in billing. However, it will be noted that under such circumstances, the cutting in of all of the 50 kilowatt nonessential or interruptible service devices Xc, Xb, Xa reoccurs when the demand for essential or noninterruptible services falls below 550 kilowatts.

As previously indicated, it is desirable to adjust the monitoring device to a desirable maximum instantaneous peak demand based on both essential and also interruptible services, this setting being such as not to starve the interruptible services. This setting will usually be changed throughout the year since the instantaneous load demand varies with the seasons and other factors. This adjustment is effected by moving the swinging switch arm 97 to cut into service that potentiometer of the group 100, 100a, 100c, etc., which corresponds to such an instantaneous peak demand. It will be noticed that these potentiometers are set to provide progressively different resistance. Since the swinging switch arm 97 is grounded through the resistor 103, and since the potentiometers 100, 100a, etc., are of different values, setting this switch arm 97 to cut in different potentiometers will effect a corresponding change in the voltage applied through line 104 to the grids of the triode sections 75 and 79 from the positive line 33 from the sensor U. This adjusts the operating level of the high and low reference triodes 70 and 71 to adjust the entire control system accordingly.

It will be noted that each time a different potentiometer 100, 100a, 100b, etc., is so cut into service, a correspondinglp different potentiometer 91, 91a, 91b, etc., is also cut into service by reason of the coupling together of the swinging switch arms 97 and 94 (at 98) of these two voltage dividing networks. The purpose of such coupled voltage dividing networks is as follows:

In the assumed example of operation, the operating level, line 12, FIG. 1 corresponds to selector switch arm 97 engaging contact 99 so as to put potentiometer 100 in service. This potentiometer is adjusted so that less than 600 kilowatts will fail to trigger the twin triodes 70 and 72 into shedding nonessential loads; but over 600 kilowatts will do so.

More specifically, the actual DC voltage across lines 33 and 34 of FIG. 3 is accurately proportional to the kilowatt load, and at 600 kilowatts, a DC output of several hundred volts will appear across lines 33 and 34.

The actual voltage at which tube 88 regulates (top center of FIG. 4; a part of power supply 50), is about 85 volts. It is this which is led to the grid of triode 74, the left half of twin triode 70 as the high reference voltage. Therefore, the signal fed to the grid of the triode section 75 of twin triode 70 over line 104 must equal just under 85 volts for an equivalent just under 600 kilowatts and just over 85 volts for an equivalent just over 600 kilowatts of load as seen by the sensing unit (FIG. 3). That is, when loading tries to exceed 600 kilowatts, the high reference section of the comparator should act to shed nonessential loads. Since actual DC voltage output over lines 33 and 34 is several times 85 volts, a voltage dividing network consisting of resistor 102 (FIG. 4), potentiometer 100 and resistor 103 is employed to apply that portion of total sensing unit U output voltage at 600 kilowatts as well as an actual 85 volts at the grid of triode section 75 of the high reference twin triode 70. Thus, so long as load remains below 600 kilowatts, the high reference triodes 70 and 72 remain nonconducting; but when load exceeds 600 kilowatts, these high reference triodes conduct so as to actuate relay 150 (FIG. 4) to shed loads as previously described.

Whereas line 12 in FIG. 1 has heretofore represented a high reference level of 600 kilowatts, it is desirable to provide a series of settings, so as to more efficiently and effectively follow, or adjust to, varying month to month demand situations. Thus, FIG. 4 selector switch arm 97 has seven possible contact positions 99, 99a, etc., of seven potentiometers 100, 100a, etc. Assuming that 600 kilowatts represents the absolute maximum demand expected and that it is desirable to be able to set high reference levels of, say 550, 500, 450, 400, 350 and 300 kilowatts also. Taking the latter 300 kilowatts as the other end of the range, for illustrative purposes, when only 30 kilowatts of load is present, the DC output voltage from the sensing unit U, FIG. 3, may be only a little over 100 volts. FIG. 4 selector switch arm 97 is now engaging contact 99f, associated with the potentiometer 100f. If only some 100 volts is present between lines 33 and 34 from the sensing unit U, potentiometer 100f will have to be adjusted much differently than potentiometer 100 (the 600 kilowatt potentiometer) in order to produce 85 volts in line 104 at a load of 300 kilowatts.

Recall that the high reference triodes 70 and 71 only know that a fixed, regulated 85 volts is applied to the grid of the triode section 74 of the high reference twin triode 70 and relay 150 is either deenergized or energized as the signal applied to the grid of the triode section 75 of this twin triode 70 is respectively either below or above this 85 volt reference. Therefore, for any selected kilowatt load point from 300 to 600 kilowatts (in seven steps of 50 kilowatts each) the potentiometers 100 through 100f are adjusted to produce exactly 85 volts in line 104, regardless of the actual voltage yielded by the sensing unit U at each particular load point.

To properly adjust the potentiometers 100 through 100f, it is possible to simulate current transformer signals into the FIG. 3 transformer windings 24, 25 and 26 equivalent to that anticipated at each kilowatt load point. The precise DC voltage output at lines 33 and 34 is not even important. It is only necessary to adjust the potentiometer (100–100f) associated with selector switch arm 97 position for that kilowatt level so as to produce 85 bolts in line 104. Proper setting is vertified by varying simulated signals into the sensing unit U from just under calculated valve to just over calculated value to ascertain that the high reference circuit triggers "on" and "off" at exactly this point. That is, that it is accurate and repeatable.

It has been shown that, in order to select different values for line 12 of FIG. 1, it is necessary to provide a scheme for reducing actual sensing unit U output voltage to 85 volts, corresponding to the reference voltage supplied to the grid of the triode section 74 of twin triode 70, that is, at exactly the kilowatt load point manually selected by switch arm 97 of what is actualy a double pole selector switch. The other switch arm 94 is mechanically linked to switch arm 97 (as shown by dotted line 98). This deck of the selector switch also has a voltage dividing network associated with it, consisting of potentiometers 91 through 91f plus resistor 95, and supplied from the 85 volts present in ilne 90.

For each position of the selector switch, it is possible to select a pre-adjusted voltage to be applied to the grid of the twin triode section 78 low reference twin triode 71. This is necessary for a reason which will be explained in some detail. First, to review we have assumed nonessential load devices of 50 kilowatts each. Our high reference selectable range is 300 to 600 kilowatts in seven steps of 50 kilowatts each. In the 600 kilowatt position, if load drops from 600 to 550 kilowatts we can put one 50 kilowatt device on to bring load back to 600 kilowatts. This means a drop from 100% to some 92%; or a change of less than 10%. At the other extreme, when the selector switch is in the 300 kilowatt position, load must go down to 250 kilowatts in order to accommodate one 50 kilowatt nonessential device. Here a drop to 83% of original value; or a change of nearly 20% must occur.

Sensing unit U output voltage at 600 kilowatts may be, say, 250 volts, so that about a 10% change, from 600 down to 550 kilowatts will probably cause about a 25 volt drop in DC voltage output. At 300 kilowatts, output may be around 150 volts so that a 20% drop in kilowatts may cause about a corresponding 20% or 30 volt drop in the signal. One might at first think that the situation would almost take care of itself, but we must recall that once a voltage divider network is adjusted, it becomes a strictly percentage device.

If, as suggested above; 250 volts equals 600 kilowatts, and if we select 85/250 to get an 85 volt signal then this is a 34% division, and if sensing unit U output drops to 225 volts, signal will become 34% of this, or about 77 volts.

If, in the 300 kilowatt selector switch position, sensing unit output is, as indicated above, 150 volts, and we adjust for 85/150, then this divider is set for some 57%. If sensing unit output drops from 150 to 120 volts when load goes from 300 to 250 kilowatts, then an 85 volt signal drops to 57% of 150, or 68 volts.

Thus, it may be seen that, whereas at 600 kilowatts, an 85 volts signal will drop to 77 volts (in line 104, FIG. 4) for a 50 kilowatt drop down to 550 kilowatts, in the 300 kilowatt position, the same 85 volt signal will drop to 68 volts for a 50 kilowatt drop down to 250 kilowatts.

Note that, when the load drops by 50 kilowatts, we desire to activate the low reference circuit at each selected switch arm 97 position. Whereas the dead band equivalent to 50 kilowatts is 85 minus 77, or 8 volts at 600 kilowatts, it is 85 minus 68 or 16 volts at 300 kilowatts. Those intermediate kilowatt levels between 300 and 600 kilowatts will have intermediate dead band widths, and each low reference voltage must be carefully set to assure actuating relay 173, FIG. 4 whenever load drops by 50 kilowatts in whatever position the level selector switch arm 97 may be in.

From the foregoing it will be seen that the monitoring device of the present invention effects economy in use of industrial electric power to the advantage of both the supplier and the customer and does so with a simple and reliable apparatus which is accurate in response while at the same time rugged and reliable in operation.

We claim:

1. A load control system for regulating the supply of electric power to a load including noninterruptible services and interruptible services having predetermined priority to provide an economical load factor comprising, a source of electric power connectible to said services, means adapted to continuously sense the total current being supplied to all of said services by said source and to generate a load signal proportional to said total current, means establishing a maximum reference signal representing a maximum predetermined load current, means establishing a minimum reference signal representing a minimum predetermined load current, means comparing the load signal with said reference signals, means responsively to said comparing means for disconnecting simultaneously all of said interruptible services from said source when said load signal rises above said maximum reference signal, and means for reconnecting said interruptible services sequentially in said priority order until the load signal is of a value intermediate the maximum and minimum reference signals, said reconnecting means including a nonreversible motor-operated cam switch which pulses a solenoid-actuated stepping switch which is normally reset to a starting position and which steps only if the load signal is below the minimum reference signal.

References Cited

UNITED STATES PATENTS

| | | | |
|---|---|---|---|
| 2,641,716 | 6/1953 | Hyer et al. | 307—35 |
| 3,133,202 | 5/1964 | Wildi | 307—38 |
| 3,291,998 | 12/1966 | Wildi | 307—38 X |

ROBERT K. SCHAEFER, *Primary Examiner.*

H. HOHAUSER, *Assistant Examiner.*